UNITED STATES PATENT OFFICE.

GEORG MERLING AND HUGO KÖHLER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING ISOPRENE.

1,026,692.     Specification of Letters Patent.     Patented May 21, 1912.

No Drawing.     Application filed February 20, 1911. Serial No. 609,565.

*To all whom it may concern:*

Be it known that we, GEORG MERLING and HUGO KÖHLER, doctors of philosophy, chemists, citizens of the German Empire, residing at Elberfeld, Germany, have invented new and useful Improvements in Processes for Producing Isoprene, of which the following is a specification.

We have found that isopropenylmethylcarbinol of the formula:

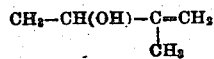

is converted into isoprene of the formula:

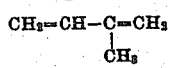

by at first replacing the hydroxyl of the olefin alcohol by a halogen and then treating the halogenated product thus obtained with an agent, such as quinolin, alcoholic alkali, etc., which is capable of splitting off halogenhydrid.

The isopropenylmethylcarbinol can be obtained by heating the ammonium base obtained from 3-methyl-2-oxy-butyldimethyl-amin:

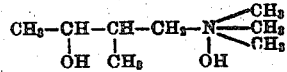

In order to illustrate the new process more fully the following example is given, the parts being by weight:—2.5 parts of phosphorous pentachlorid finely pulverized are gradually introduced while being cooled and stirred into 1 part of isopropenylmethylcarbinol. The separated brownish oil is then poured on a surplus of soda solution cooled with ice. Subsequently the heavy oil remaining (after the phosphorous oxychlorid has been decomposed) in an insoluble state, is heated in a reflux condenser with alcoholic alkali and the isoprene escaping therefrom is condensed in a tube cooled with ice and is purified by a fractional distillation.

We claim:—

1. The herein described process for producing isoprene, which process consists in at first replacing the hydroxyl of isopropenylmethylcarbinol by a halogen and then treating the halogenated product thus obtained with an agent which is capable of splitting off halogen hydrid, substantially as described.

2. The herein described process for producing isoprene, which process consists in at first replacing the hydroxyl of isopropenylmethylcarbinol by chlorin and then treating the chlorinated product thus obtained with alcoholic alkali, substantially as described.

In testimony whereof we have hereunto set our hands in the presence of two subscribing witnesses.

GEORG MERLING. [L. S.]
    HUGO KÖHLER. [L. S.]

Witnesses:
    CHAS. J. WRIGHT,
    ALFRED HENKEL.